Sept. 26, 1950         M. SENKUS         2,523,482
PROCESS FOR REFINING PENICILLIN X AMMONIUM SALT
Filed Aug. 7, 1946         2 Sheets-Sheet 1
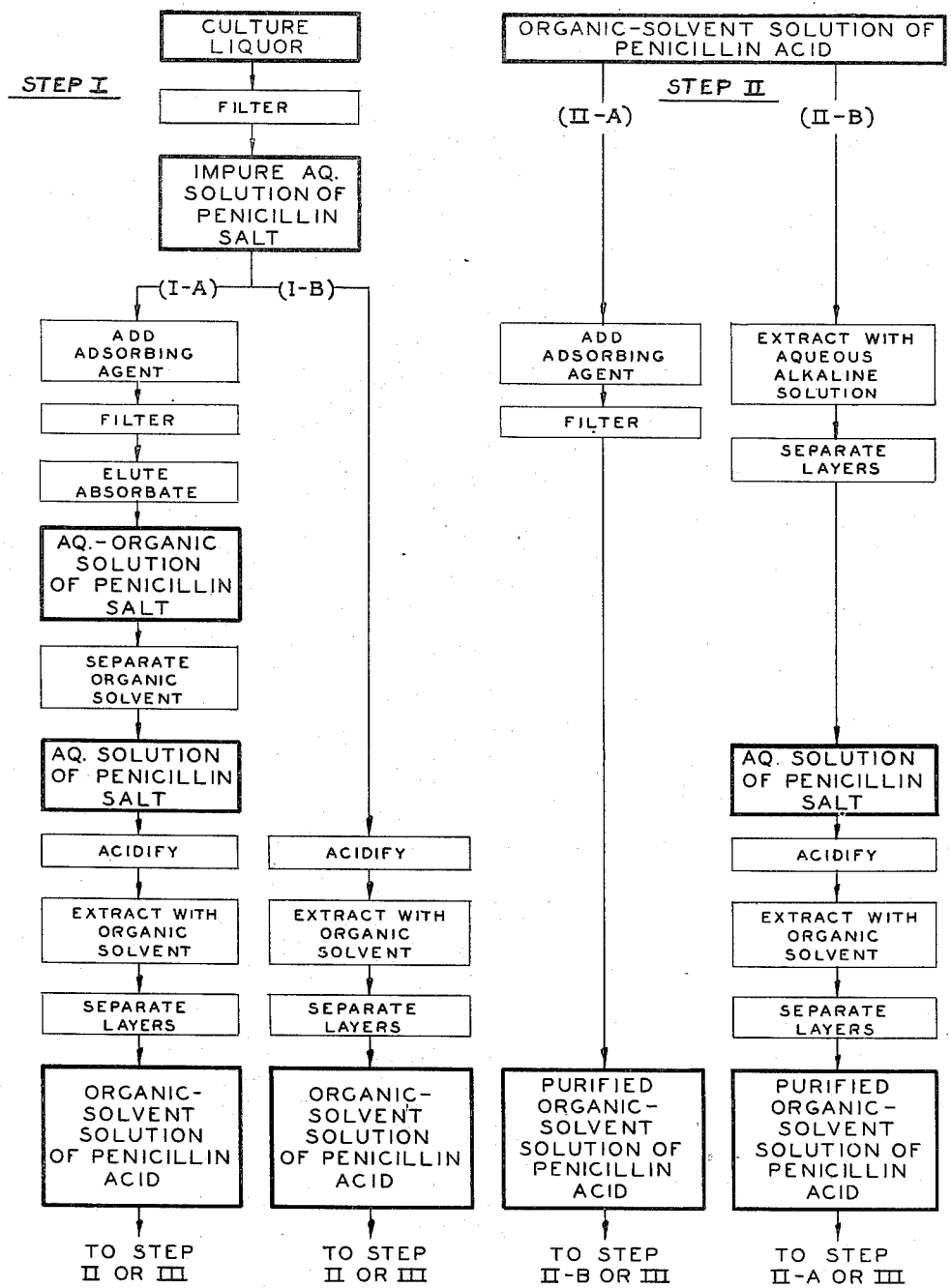
INVENTOR
Murray Senkus
BY Francis M. Crawford

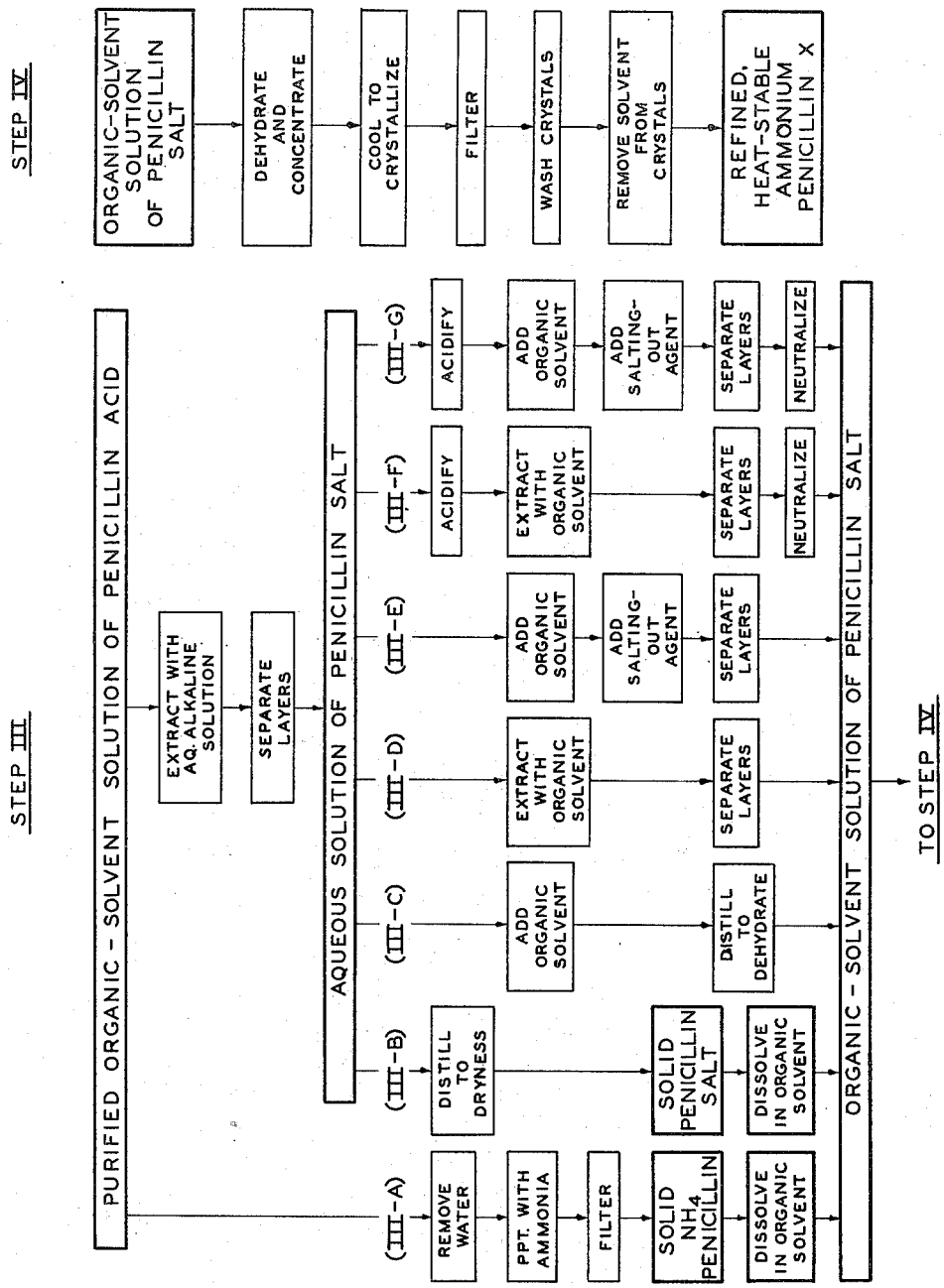

Patented Sept. 26, 1950

2,523,482

UNITED STATES PATENT OFFICE 2,523,482

PROCESS FOR REFINING PENICILLIN X AMMONIUM SALT

Murray Senkus, Terre Haute, Ind., assignor to Commercial Solvents Corporation, Terre Haute, Ind., a corporation of Maryland Application August 7, 1946, Serial No. 688,848

10 Claims. (Cl. 260—302)

My invention relates to a process for refining penicillin X, and for separating substantially pure penicillin X in the form of its heat-stable, crystalline ammonium salt from crude mixtures thereof with other forms of penicillin.

Penicillin is a metabolic by-product of the growth of molds such as *Penicillium notatum* and *Penicillium chrysogenum*, when propagated aerobically in suitable nutrient media. Minute quantities of the material are produced in the nutrient culture liquor in at least four different forms, which have been designated in the art as penicillin F, penicillin G, penicillin K, and penicillin X. The penicillin material thus produced has valuable antibiotic properties toward numerous microorganisms, and when sufficiently concentrated and purified, it may be administered therapeutically to human beings to combat various infections.

For therapeutic uses, the concentration and purification of penicillin need not be carried to the point of isolation of the pure material. However, the presence of certain impurities in the product is highly objectionable, owing to their tendency to produce toxic, febrile, and allergic reactions in the patient. Herxheimer reactions have thus been observed in the treatment of syphilis, necrosis sometimes occurs at the point of injection, and the incidence of urticaria after injections of impure penicillin is undesirably high. It will be apparent, moreover, that the intrathecal injection of low-purity penicillin is highly objectionable from a clinical standpoint, and that the injection of massive quantities of penicillin to treat systemic infections is undesirable with low-potency penicillin preparations, owing to the large quantities of foreign matter that would simultaneously be introduced into the patient.

Prior to my invention, penicillin was marketed only as an amorphous material, which has the serious disadvantage of being unstable during storage at ordinary temperatures. Even when refrigerated, such preparations lose their therapeutic activity to such an extent that after a few months the original assay of the material can no longer be depended upon, and any material not used within the period specified (as regulated by the Food and Drug Administration) must be discarded or reprocessed.

A further disadvantage of penicillin as heretofore prepared is the uncertain ratio therein of the various forms of penicillin. This is objectionable because of the recognized differences among the various forms of penicillin with respect to stability in vivo and with respect to antibiotic activity toward various pathogenic organisms. Penicillin K, for example, is so unstable in vivo that practically all of it is rapidly destroyed in the human body. Penicillin G and penicillin X, on the other hand, are comparatively stable under the same circumstances, and are therefore definitely to be preferred for introduction into the human body. Penicillin X, moreover, is definitely superior in combatting such diseases as gonorrhea, whereas penicillin G is more effective toward *Staphylococcus aureus*. It is clearly important in the administration of penicillin, therefore, to know the composition of the particular preparation being used, and preferably to use a pure penicillin salt of the desired form.

I have now found it possible to refine penicillin X and prepare it in the form of its heat-stable, crystalline ammonium salt by a process wherein the penicillins are transferred from the culture liquor through a succession of solvents, and ammonium penicillin X is ultimately crystallized from a suitable organic solvent, hereinafter to be described.

Unexpectedly, I have found that the ammonium penicillin X produced by my invention is substantially free from the undesirable penicillins F and K, which are unstable in vivo; and I have found further that my process is capable of producing ammonium penicillin X that is substantially free from penicillin G by the crystallization operation of Step IV, described below, even in the presence of substantial proportions of penicillin G. This is a remarkable result, in view of the comparatively trivial differences among the various forms of penicillin. Penicillin is a large molecule, and penicillin X differs from the other forms only in one comparatively small substituent group. It would normally be expected, therefore, that the various forms would crystallize under about the same conditions, and that the crystalline products would be mixtures of all the forms. Instead, I have succeeded in separating penicillin X substantially completely by a single crystallization step.

It is known in the art that the various forms of penicillin may be separated chromatographically; that is, by passing a solution of salts of the mixed penicillins through a column packed with a suitable adsorptive solid, then assisting the separation into bands by passing fresh solvent through the column, next dividing the adsorptive material into sections, and finally eluting the various sections and assaying. It is obvious that this method is purely and simply a laboratory process, and is entirely unsuited for the largescale preparation of refined, heat-stable salts of penicillin X.

My process comprises broadly four steps:

*Step I.*—Transfer of the penicillin from the culture liquor into an organic solvent for penicillin X.

*Step II.*—Purification of the penicillin solution from Step I.

*Step III.*—Transfer of the penicillin from the previous step into a solvent suitable for crystallizing ammonium penicillin X.

*Step IV.*—Crystallization of ammonium penicillin X.

The various operations required for carrying out the above steps are outlined in the accompanying flow diagrams, and are described more fully in the sections below.

STEP I

In Step I of my process, the penicillin culture liquor is first filtered to remove suspended solids, and the penicillin which exists in the culture liquor as a mixture of salts at the conclusion of the fermentation is then transferred from the filtered culture liquor into an organic solvent for penicillin X by well-known procedures.

*Step I-A.*—I may, for example, adsorb the penicillin salts from the filtered culture liquor on an active charcoal, char, or carbon and subsequently elute the penicillin salts from the resulting adsorbate with an aqueous-organic solvent mixture, such as aqueous acetone or a mixture of water and amyl acetate; then separate the organic solvent by decantation, if the eluate is heterogeneous; or by evaporation, leaving the penicillin salts in aqueous solution; and finally acidify and extract with a suitable immiscible organic solvent for the acid form of penicillin X, such as n-butyl acetate, amyl acetate, isobutyl methyl ketone, or n-butyl alcohol.

*Step I-B.*—Alternatively, I may acidify the filtered culture liquor and extract with a suitable immiscible organic solvent for the acid form of penicillin X.

A preliminary extraction of the culture liquor with chloroform is advantageous prior to Step I in the refining of penicillin X. Penicillin X, unlike other forms of penicillin, is only slightly soluble in chloroform. The other forms are therefore carried away in the preliminary extraction with chloroform; and the possibility that ammonium penicillin G or the ammonium salts of other forms of penicillin may separate with the desired ammonium penicilin X in the crystallization operation of Step IV is thereby minimized.

It is possible, under certain conditions, to prepare heat-stable, crystalline ammonium penicillin X directly from the organic-solvent solution of penicillin acid resulting from Step I, omitting Steps II and III, by neutralizing as in Step III and then proceeding as in Step IV. This is possible only where the concentration of organic, non-penicillin impurities in the culture liquor is low; and in this procedure the solvent for Step I must either be chosen from the group, specified hereinafter, that is operative for the crystallization step, or must be replaced with such a solvent, as will be described below under the heading of Solvents for Steps III-F and III-G.

STEP II

All of the operations of the various steps of my process tend to produce some degree of purification, in the sense of separating the penicillin from organic, non-penicillin impurities. In addition to Steps I, III, and IV, further purification of the penicillin solutions of my process prior to crystallization is usually desirable, but such additional purification may be omitted in the processing of penicillin from culture liquors containing relatively low proportions of impurities. The purification may be carried out by a number of means, of which the following are illustrative:

*Step II-A.*—I have found that substantial proportions of impurities of unknown compositions may be removed by treating the penicillin solutions at one or more of the various stages of my process with a small proportion of an active charcoal, an active magnesium silicate, or other material of the type commonly referred to as decolorizing agents. This treatment may be carried out by slurrying the decolorizing agent with the penicillin solution and subsequently filtering off the decolorizing agent, now carrying a substantial proportion of the impurities.

*Step II-B.*—An alternative or supplemental purification procedure comprises a multiple-step extraction of the aqueous penicillin solution resulting from Step I alternately into aqueous alkaline solutions and then, as described for Step I, under acid conditions into organic solvents for the acid form of penicillin X.

STEP III

In Step III of my process, the penicillin from the preceding step is transferred into an organic solvent suitable for crystallizing ammonium penicillin X. Numerous procedures have been found satisfactory for carrying out this transfer, of which the following are illustrative:

*Step III-A.*—An organic solvent solution of the acid form of penicillin from Step I or II is freed from water by distillation at low pressure, for example, or by treatment with a suitable dehydrating agent, and the penicillin acid is then precipitated as the ammonium salts by introducing dry ammonia into the solution in the form of pure, gaseous compound, or admixed with an inert gas such as nitrogen, or dissolved in an inert organic solvent. The precipitation is then separated from the mother liquor and is dissolved in a suitable organic solvent, of the class disclosed below, with mild heating if necessary.

*Step III-B.*—An organic-solvent solution of the acid form of penicillin from Step I or II is extracted with an aqueous solution of an alkaline ammonium compound. After being separated, the resulting aqueous solution of ammonium penicillins is dried, preferably lyophilically, and preferably at temperatures below about 40° C., and the dried product is dissolved in a suitable crystallization solvent, with mild heating if necessary.

*Step III-C.*—An organic-solvent solution of the acid form of penicillin from Step I or II is extracted with an aqueous solution of an alkaline ammonium compound, and the layers are separated. To the resulting aqueous solution of ammonium penicillins is added a suitable organic crystallization solvent, and the water is removed by distillation, preferably at temperatures below about 40° C., leaving the ammonium penicillins dissolved in the residual organic solvent.

*Step III-D.*—An organic-solvent solution of the acid form of penicillin from Step I or II is extracted with an aqueous solution of an alkaline ammonium compound, the layers are separated, and the resulting aqueous solution is re-extracted directly with a suitable water-immiscible crystallization solvent.

*Step III–E.*—An organic-solvent solution of the acid form of penicillin from Step I or II is extracted with an aqueous solution of an alkaline ammonium compound, and the layers are separated. The resulting aqueous solution is adjusted to a pH preferably within the range of about 5 to 8.5, and to it are added a suitable crystallization and solvent and a quantity of a suitable salting-out agent, described below. The ammonium penicillins are thereby transferred into the crystallization solvent.

*Step III–F.*—An organic-solvent solution of the acid form of penicillin from Step I or II is extracted with an aqueous alkaline solution, and the layers are separated. The resulting aqueous penicillin salt solution is acidified and extracted directly with an immiscible organic solvent for penicillin X, suitable for crystallizing ammonium penicillin X. The organic-solvent extract is then separated and neutralized with an alkaline ammonium compound.

*Step III–G.*—An organic-solvent solution of the acid form of penicillin from Step I or II is extracted with an aqueous alkaline solution, and the layers are separated. The resulting aqueous penicillin salt solution is acidified, and to it are added an immiscible organic solvent for penicillin X, suitable for crystallizing ammonium penicillin X, and a quantity of a suitable salting-out agent, described below. The acid form of penicillin is thereby transferred into the organic solvent. The organic-solvent extract is then separated and neutralized with an alkaline ammonium compound.

The extraction, specified in Steps III–B through III–G, of the organic-solvent solution of the acid form of penicillin with an aqueous alkaline solution is preferably carried out to a pH within the range of about 6 to 8.

All of the aqueous solutions mentioned in Steps III–B and III–G should preferably be fairly concentrated in order to reduce the quantity of organic solvent and/or salting-out agent used in the succeeding operations. For this reason, I ordinarily prefer to concentrate any dilute aqueous solutions at this stage of my process to around 15,000 Oxford units of penicillin activity per milliliter or higher by distilling the solutions at low temperatures and under reduced pressure.

The acidification required in Steps III–F and III–G is carried out with any of the common inorganic acids, such as sulfuric acid or hydrochloric acid, but preferably with phosphoric acid, to a pH of about 2 to 4. The subsequent extraction should be carried out as rapidly as possible, owing to the relative instability of penicillin under such acid conditions.

For the neutralization of the organic-solvent solutions from Steps III–F and III–G, prior to Step IV, ammonium hydroxide, ammonium carbonate, and ammonium bicarbonate may be used satisfactorily; and buffering agents, such as ammonium phosphates, are also operative, but are somewhat less desirable because they tend to contaminate the product. The neutralizing agent may be added in any desired manner, for example, as an aqueous solution, or as an aqueous solution diluted with an organic solvent. The latter alternative is preferable, since it avoids the addition of excessive quantities of water, which tends to retard and repress crystallization.

STEP IV

In Step IV of my process, the organic-solvent solution of ammonium penicillins is distilled, preferably at temperatures below about 40° C. and at reduced pressure, to dehydrate and to concentrate the solution to the point of saturation at ordinary temperatures, whereupon crystallization of ammonium penicillin X usually begins. If the pH of the solution changes appreciably during the concentration, the concentrate should preferably be neutralized as described under Step III; and under some conditions, seeding with crystals of ammonium penicillin X may be desirable. Crystallization may be hastened and rendered more nearly complete by cooling the concentrate below room temperature and allowing it to stand. After crystallization is complete, the crystals are separated by filtration, for example, and are then washed and dried.

Organic-solvent penicillin solutions may be distilled according to the above procedure at low pH levels, but should preferably first be neutralized as specified for Steps III–F and III–G, in order to minimize decomposition of the penicillin during the distillation step. Moreover, the distillation at low pH levels is a less convenient procedure, since under these conditions crystallization seldom occurs; it is therefore necessary to stop the distillation at an arbitrary penicillin concentration, usually around 50,000 Oxford units per milliliter, and then to add an appropriate alkaline ammonium compound in order to initiate the crystallization.

Any water that may be present in or with the organic-solvent solution of ammonium penicillins at the end of Step III is ordinarily removed substantially completely in Step IV by distillation at reduced pressure, in order to increase the yield of crystalline product. Complete removal of such water, however, is not an essential feature of my process.

The crystallization operation of Step IV is preferably carried out around pH 7.0 for best results, but it is operative to some degree within the pH range of about 4 to 8.5. For this reason, the term "neutralization," when applied without qualification to the treatment of penicillin solutions for or in Step IV, is to be construed as referring to the adjustment of the pH of such solutions to the range of about 4 to 8.5, thereby insuring that the penicillins in such solutions will be present primarily in the form of salts.

PRODUCTS

By means of the foregoing procedures, I have succeeded in refining penicillin X and preparing it in the form of the heat-stable, crystalline ammonium salt, and also in the form of crystalline ammonium penicillin X substantially free from other types of penicillins.

Similar procedures have also been found effective for the refining of potassium penicillin X, as disclosed in copending application Serial No. 688,849, filed August 7, 1946, now U. S. Patent 2,520,099.

During the crystallization operation of my process, ammonium penicillin X tends to separate alone if penicillin G is absent from the solution for any reason, such as through failure of the Penicillium organism to produce penicillin G during the fermentation, or through separation and removal of the penicillin G by any means prior to the crystallization operation. One such means comprises a preliminary extraction of the culture liquor with chloroform to remove penicillins other than penicillin X, as described under Step I–B.

Substantially pure ammonium penicillin X can be crystallized also from solutions in Step IV containing substantial proportions of penicillin G. In such case, the crystallization should be conducted fractionally, according to well-known procedures, whereupon ammonium penicillin X will crystallize in substantially pure form until the concentration of ammonium penicillin G reaches the point where it saturates the solution.

Even in the presence of comparatively large proportions of penicillin G, the crystallization operation of Step IV of my process results in a refining of penicillin X in the sense that the penicillin X is separated at least in part from non-penicillin organic and inorganic impurities, and from penicillins F and K, which are undesirable because of their instability in vivo. It is to be distinctly understood, therefore, that such refining is comprised within the scope of my invention.

SOLVENTS

For the crystallization-refining of ammonium penicillin X, as carried out in Step IV of my process, I have successfully employed aliphatic primary monohydric alcohols having 4 to 6 carbon atoms in the molecule. As examples of such alcohols may be cited n-butyl alcohol, isobutyl alcohol, n-amyl alcohol, isopentyl alcohol, 2-methyl-1-butanol, t-butylcarbinol, and n-hexyl alcohol.

In Steps III–F and III–G I may also carry out the extraction of the acidified aqueous solution with any solvent for the acid form of penicillin X that is immiscible with the acidified aqueous penicillin solution, and then, prior to the concentrating and crystallizing operations of Step IV, add any of the solvents, specified above, suitable for crystallizing ammonium penicillin X, and distill out the solvent initially used. For this purpose, the second solvent should obviously have a boiling point near to or higher than the first solvent, and in any event must be capable of forming, during distillation, a vaporous mixture comprising a substantial proportion of the first solvent.

In all of the modifications of Step III, the organic solvent is ideally used in such quantity as will give a solution of ammonium penicillins that is saturated at ordinary temperatures. However, a somewhat greater quantity of solvent is ordinarily used in carrying out the extraction procedures described under Step III, in order to insure substantially complete extraction of the penicillin salt or penicillin acid from the aqueous solution. In nearly all cases, the quantity of organic solvent should preferably be somewhat less than the volume of the aqueous penicillin solution, so that a certain degree of concentration of the penicillin is effected in the extraction step.

SALTING-OUT AGENTS

In Step III–E, a salting-out agent is added to the aqueous solution of penicillin salts as a means of driving the penicillin salts, which are primarily organic in nature, into the organic solvent. Suitable salting-out agents for use in this step include water-soluble ammonium salts having inorganic anions, such as the sulfate, chloride, bromide, phosphate, and the like; and water-soluble ammonium salts having organic anions, such as the acetate, propionate, butyrate, valerate, benzoate, citrate, tartrate, oxalate, and the like.

The salting-out operation of Step III–E is preferably carried out within a pH range between about 5 and 8.5. Many of the salting-out agents listed above have pH values in aqueous solution within this range. In the case of those which have pH values somewhat outside this range, the pH of the solution may be adjusted by the addition of the corresponding acid or basic component of the particular salting-out agent, so that the salting-out process is carried out within the preferred pH range.

In Step III–G, only salting-out agents having inorganic anions are suitable for use in the salting-out process, owing to the fact that agents having organic anions would be decomposed under the acidic conditions employed in this step, and the resulting organic acids would be selectively extracted by the organic solvent, simultaneously with the penicillins. Water-soluble salts composed of inorganic anions with ammonium cations, alkali-metal cations, and alkaline-earth-metal cations are operative in general in Step III–G. Among such salts are the water-soluble sulfates, chlorides, bromides, and phosphates of ammonium, sodium, potassium, and magnesium.

The quantity of salting-out agent used in Step III–E and III–G is not particularly critical, but should be sufficient to cause the preponderant proportion of penicillin to seek the organic-solvent phase in preference to the water phase; and quantities up to enough to saturate the water layer result in forcing greater proportionate quantities of penicillin salt into the organic-solvent layer. Ordinarily, a quantity sufficient to form around a 25% solution of the salting-out agent in the aqueous phase is ample.

PRODUCT IDENTIFICATION

The existence of a number of forms of penicillin is believed to be due to a difference of a single substituent radical among the various forms. This results in differences in the ultraviolet absorption spectra for various forms of penicillin, depending on the substituent radicals, and in radically different antibiotic behavior toward various organisms. The latter affords a convenient means for distinguishing among the various forms, as will be obvious from the following table:

*Properties of ammonium penicillins*

| Form of Penicillin | Molecular Weight | Antibiotic Activity | | |
|---|---|---|---|---|
| | | S. aureus | B. subtilis | Subtilis aureus |
| | | units/mg. | units/mg. | |
| F | 357 | 1,925 | 1,310 | 0.68 |
| G | 351 | 1,690 | 1,690 | 1.0 |
| K | 369 | 2,330 | 840 | 0.36 |
| X | 367 | 960 | 1,310–1,450 | 1.36–1.5 |

The unit of penicillin activity referred to in the above table and elsewhere in this application is the Standard Unit established by the U. S. Food and Drug Administration on March 25, 1944, and based on pure, crystalline sodium penicillin G, having an arbitrarily ascribed antibiotic activity of 1650 units per milligram of solids against the organism *Staphylococcus aureus*. (A. C. Hunter and Wm. R. Randall, "Standardization of Assay of Penicillin," J. Assoc. of Official Agricultural Chemists, August 1944, pp. 430–438.) While this unit is not precisely the Oxford unit, it is so close to it as to be well within the experimental error of the assays used; and for lack of a precise name, this unit is more or less universally referred to as synonymous with the Oxford unit.

EXAMPLES

The following specific examples will further illustrate my invention:

*Example I*

The following example illustrates the preparation of stable, crystalline ammonium penicillin X by a process including steps I-B and III-A:

A quantity of penicillin culture liquor was acidified and extracted with amyl acetate, and an 11.2-liter portion of the resulting extract was concentrated to 4.25 liters by distillation at 30 mm. Hg. Gaseous ammonia, diluted with nitrogen, was passed into the concentrate, whereupon crude ammonium penicillin was precipitated and was then separated by filtration and dried. The yield was 55.5 grams of solid assaying 630 units per milligram, and corresponding to a 100% conversion, based on the amyl acetate extract.

The crude, dry ammonium penicillin was dissolved in 250 ml. of n-butyl alcohol, and the solution was cooled to around 0° C. to assist in the crystallization. From the resulting slurry, 14.5 grams of crystalline ammonium penicillin were separated, having the following assays:

Against *Staphylococcus aureus*__units/mg__ 960
Against *Bacillus subtilis*_____units/mg__ 1310
*Subtilis* : *aureus* ratio_____ 1.36
Conversion, based on crude precipitate_____ 42%

The assays indicate that the product was predominantly ammonium penicillin X.

*Example II*

The following example illustrates the preparation of crystalline ammonium penicillin X by a process including Steps I-A and III-E:

A quantity of penicillin culture liquor was agitated with an active char known as Darco G-60, the resulting slurry was filtered, the char adsorbate was eluted with aqueous acetone, and the eluate was evaporated until free from acetone. The resulting aqueous solution, measuring 62 liters and assaying 500 units/ml. against *Staphylococcus aureus*, was acidified to pH 2.5 with phosphoric acid and extracted with 13 liters of n-butyl acetate. The n-butyl acetate extract was then re-extracted with one liter of aqueous 1.5% ammonium bicarbonate, yielding 1100 ml. of aqueous ammonium penicillin. To this solution were then added 300 ml. of n-butyl alcohol and 600 grams of solid ammonium sulfate. The mixture was agitated until all of the ammonium sulfate had dissolved, and the upper layer, measuring 450 ml., was separated and mixed with 150 ml. of dry acetone to precipitate the small quantity of dissolved ammonium sulfate. The resulting precipitate was filtered off, and the filtrate was distilled under vacuum to a final volume of 200 ml., at which point crystallization began. From the resulting slurry, after refrigeration, were separated 8.61 g. of crystalline ammonium penicillin having the following assays:

Against *Staphylococcus aureus*
units/mg__ 950
Against *Bacillus subtilis*_____units/mg__ 1400
*Subtilis* : *aureus* ratio_____ 1.47
Conversion, based on evaporated eluate__ 26.4%

These assays indicate that the product was substantially pure ammonium penicillin X.

*Example III*

The following example illustrates the refining of ammonium penicillin X by crystallization from isopentyl alcohol in Step IV of a process including also Steps II-A and III-A:

An amyl acetate solution of the acid form of penicillin was treated with an activated charcoal and then distilled to remove dissolved water. Into the dry, purified solution, assaying 8100 units per milliliter, was passed a mixture of ammonia and nitrogen until precipitation was complete; and from the resulting slurry was separated crude, amorphous ammonium penicillin which, after being dried, weighed 51 grams and assayed 630 units/mg. The amorphous salt was dissolved in 250 ml. of isopentyl alcohol with gentle heating; and when the resulting solution was cooled, crystals of ammonium penicillin formed. The crystals were separated from the residual solvent by filtration; and after being washed with acetone and air-dried, they weighed 14.2 grams, assayed 860 units/mg. against *Staphylococcus aureus*, and had a *subtilis* : *aureus* ratio of 1.36. The assays indicated that the product was predominantly ammonium penicillin X. The conversion, based on the penicillin content of the amorphous salt, was 38%.

While the above examples describe the preferred embodiments of my invention, it will be understood that departures may be made therefrom within the scope of the specification and claims. In general it may be said that any modifications or equivalents that would ordinarily occur to those skilled in the art are to be considered as lying within the scope of my invention.

In accordance with the foregoing specification, I claim as my invention:

1. A process of obtaining pure crystalline ammonium penicillin X from penicillin mixtures produced from culture liquors and wherein penicillin X is present as the major penicillin component, which comprises the steps of preparing a concentrated solution of ammonium penicillin salts from such a penicillin mixture, which is saturated with respect to ammonium penicillin X and wherein ammonium penicillin X is the major penicillin component, in a solvent selected from the group consisting of aliphatic primary monohydric alcohols having from 4 to 6 carbon atoms in the molecule, and cooling and crystallizing refined heat-stable ammonium penicillin X therefrom.

2. The process of claim 1 wherein said concentrated solution of ammonium penicillin salts is prepared from a concentrated solution, wherein the penicillin mixture is present in acid form, by adding a water-soluble alkaline ammonium compound to neutralize the concentrated solution.

3. The process of claim 1 wherein said concentrated solution of ammonium penicillin salts is prepared by dissolving in said monohydric alcohol an amorphous mixture of dry ammonium penicillin salts.

4. The process of claim 1 wherein said concentrated solution of ammonium penicillin salts is prepared by adding said monohydric alcohol to an aqueous solution of said salts followed by distilling the water therefrom and further concentrating the alcohol solution.

5. The process of claim 1 wherein said concentrated solution of ammonium penicillin salts is prepared by adding said monohydric alcohol and a water-soluble ammonium salt having a nonreactive anion, as a salting out agent, to an aqueous solution of said penicillin salts, followed by separating the resulting layers and further concentrating the alcohol layer.

6. The process of claim 1 in which the aliphatic primary monohydric alcohol is n-butyl alcohol.

7. The process of claim 1 in which the aliphatic primary monohydric alcohol is isobutyl alcohol.

8. The process of claim 1 in which the aliphatic primary monohydric alcohol is n-amyl alcohol.

9. A process of obtaining pure crystalline ammonium penicillin X from a solution of a mixture of ammonium salts of penicillin produced from penicillin culture liquors and wherein ammonium penicillin X is the major penicillin component and ammonium penicillin G is a minor component, in a solvent selected from the group consisting of aliphatic primary monohydric alcohols having from 4 to 6 carbon atoms in the molecule; which comprises distilling said solution until the concentration of ammonium penicillin X is above the concentration required to saturate the solution, discontinuing the distillation before the ammonium penicillin G has reached the concentration required to saturate the solution and separating substantially pure crystalline ammonium penicillin X from the resulting concentrate.

10. A process of obtaining pure crystalline ammonium penicillin X from penicillin mixtures produced from culture liquors and wherein penicillin X is present as the major penicillin component, which comprises the steps of preparing a concentrated solution of ammonium penicillin salts from such a penicillin mixture, which is saturated with respect to ammonium penicillin X and wherein ammonium penicillin X is the major penicillin component, in a solvent selected from the group consisting of the aliphatic primary monohydric alcohols having from 4 to 6 carbon atoms in the molecule, seeding the saturated solution with crystals of ammonium penicillin X, cooling the solution to cause crystallization of the ammonium penicillin X from the solution and recovering the crystals.

MURRAY SENKUS.

REFERENCES CITED

The following references are of record in the file of this patent:

UNITED STATES PATENTS

| Number | Name | Date |
|---|---|---|
| 2,479,296 | Behrens | Aug. 16, 1949 |

OTHER REFERENCES

Abraham: British J. of Experimental Pathology, vol. 23, June 1942, No. 3, pp. 103–115.

Science, July 3, 1942, pp. 20 and 21, vol. 96.

Nature, Oct. 7, 1944, p. 459, Cu. 4; pp. 4–10.

Cutter Laboratory Reports, Cu. 5, pp. 1–14; Cu. 6, pp. 1–2, 6–9; Cu. 8, p. 1.

Coghill: Northern Region Lab. Reports, No. 9-C-IX, pp. 1–6.

Certificate of Correction

Patent No. 2,523,482                          September 26, 1950

MURRAY SENKUS

It is hereby certified that error appears in the printed specification of the above numbered patent requiring correction as follows:

Column 3, line 54, for "penicilin" read *penicillin*; column 4, line 13, for the word "compositions" read *composition*; line 46, after "of" insert *the*; column 5, line 11, before "solvent" strike out "and"; line 44, for "and" read *through*; column 8, line 70, for "R," read *R.*;

and that the said Letters Patent should be read as corrected above, so that the same may conform to the record of the case in the Patent Office.

Signed and sealed this 2nd day of January, A. D. 1951.

[SEAL]

THOMAS F. MURPHY,
                                                    *Assistant Commissioner of Patents.*